United States Patent
Williams et al.

[11] Patent Number: 6,158,574
[45] Date of Patent: Dec. 12, 2000

[54] ROLLER CONVEYOR

[76] Inventors: Dwon A. Williams, 213 S. Main, Fillmore, Ind. 46128; Eddie H. Woods, 3193 Van Bibber Lake Estates C-11, Greencastle, Ind. 46135

[21] Appl. No.: 09/259,492

[22] Filed: Feb. 26, 1999

[51] Int. Cl.[7] .................................................. B65G 13/06
[52] U.S. Cl. ........................... 198/791; 198/789; 198/780
[58] Field of Search .................................... 198/791, 789, 198/780

[56] References Cited

U.S. PATENT DOCUMENTS

| | | |
|---|---|---|
| 445,293 | 1/1891 | Treat . |
| 895,621 | 8/1908 | Fawell . |
| 1,777,921 | 10/1930 | Hudson . |
| 3,374,877 | 3/1968 | Kornylak ................................ 198/127 |
| 3,888,343 | 6/1975 | Snyder ................................... 198/127 |
| 3,890,755 | 6/1975 | Specht ...................................... 52/645 |
| 4,193,492 | 3/1980 | Hammond ............................. 198/781 |
| 4,239,101 | 12/1980 | Krohmann et al. ..................... 193/37 |
| 4,802,572 | 2/1989 | Shorey et al. ......................... 198/791 |
| 4,951,808 | 8/1990 | Collins et al. ......................... 198/781 |
| 5,009,304 | 4/1991 | Schmalzl ............................... 198/372 |
| 5,011,004 | 4/1991 | D'Amato ............................... 198/791 |
| 5,038,922 | 8/1991 | Collins et al. ......................... 198/781 |
| 5,372,247 | 12/1994 | Nishikawa ............................. 198/780 |
| 5,375,696 | 12/1994 | Collins et al. ......................... 198/781 |
| 5,485,911 | 1/1996 | Kettelson et al. ...................... 198/791 |

*Primary Examiner*—Christopher P. Ellis
*Assistant Examiner*—Rashmi Sharma
*Attorney, Agent, or Firm*—Woodard, Emhardt, Naughton Moriarty & McNett

[57] ABSTRACT

A conveyor having a series of rollers in longitudinally spaced relationship along the length of two conveyor side rails, each roller extending across the space between the side rails. Each of the rollers has a drive gear mounted at one end. A set of idler gears is provided, each positioned so as to intermesh with adjacent drive gears, thus transmitting power to all of the rollers in the series. The rollers are readily removable through a slot in the top of each side rail, thus enabling convenient, independent replacement of each roller. The idler gears are mounted on shafts, which in turn are mounted in bearings bolted to the side rails. The idler gears and shafts are also readily removable individually without requiring removal of any other rollers, drive gears or idler gears. The shaft of one roller in the series is considered a main drive shaft and is coupled to a power unit. The conveyor is provided in discrete lengths so that it is usable in modular form. A lubricating oil bath is provided for the idler gears in each length, and can be filled and drained separately from the oil bath in an adjacent length of conveyor. A hinged lid and bolted bulkhead ends are provided for lubricating oil confinement and exclusion of dirt.

21 Claims, 8 Drawing Sheets

ROLLER CONVEYOR

BACKGROUND OF THE INVENTION

This invention relates generally to conveyors, and more particularly to conveyors in which the cargo is driven along the length of the conveyor by power driven rollers which support the cargo and move it along the length of the conveyor.

DESCRIPTION OF THE PRIOR ART

Many types of roller conveyors are known in the art. Those believed to be of most interest with reference to the present invention include two general types. One of them is a conveyor on which a set of rollers is longitudinally spaced along the length of the conveyor and each roller has a bevel gear attached to the end of it. A driving shaft extends along the length of the conveyor and has a set of bevel gears fastened to it, each of which engages the bevel gear on one of the rollers whereby the drive shaft drives all of the rollers simultaneously. Examples of this type of conveyor are shown in U.S. Pat. No. 895,621 issued Aug. 11, 1908, and U.S. Pat. No. 5,485,911 issued Jan. 23, 1996.

Another type of prior art conveyor is one in which rollers spaced along the length of the conveyor have a sprocket on the end of each and which is driven by a chain extending along the length of the conveyor. An example of this is shown in U.S. Pat. No. 5,372,247 issued Dec. 13, 1994.

Another type of conveyor is one having a drive shaft extending the length of the conveyor and having a friction drive arrangement associated with each of the conveyor rollers. An example is described in U.S. Pat. No. 4,193,492 issued Mar. 18, 1980.

A still further type of roller conveyor is one in which there are two sets of spur gears, an upper set and a lower set. Each gear of the upper set is connected to a conveyor roller to drive the roller. Each gear if the lower set serves as an idler, engaging two adjacent gears of the upper set. One gear of the upper set is a drive gear associated with a power input, whereby the gears of the two sets cooperate to drive all of the conveyor rollers in synchronism. Examples of such systems are shown in U.S. Pat. No. 445,293 issued Jan. 27, 1891, and U.S. Pat. No. 3,374,877 issued Mar. 26, 1968. In the latter patent, the rollers are not only longitudinally spaced along the length of the conveyor, but also they are laterally spaced as shown in that patent.

Doubtless, there are other roller conveyors known in the art, but these appear to be the most pertinent. In modem manufacturing and shipping operations, conveyors are usually essential. In such situations, failure of a conveyor can cause significant "down time" with attendant loss of productivity and all of the consequences that follow from that. Therefore, ease of maintenance and repair is important because there is inevitable wear and tear in any conveyor system. The present invention is addressed to reduction of conveyor down time and other maintenance issues.

SUMMARY OF THE INVENTION

Described briefly, in a typical embodiment of the present invention, a conveyor has a series of powered rollers in longitudinally spaced relationship along the length of two conveyor side rails, each roller extending across the space between the side rails. Each of the rollers has shafts at both ends, and a drive gear is mounted on the shaft at one end of each roller. The shaft of one roller in the series is considered a main drive shaft and is coupled to a power unit driving the main drive shaft. A set of idler gears is also provided. One such idler gear is engaged with the drive gear of each of two adjacent rollers in the sequence, thus transmitting power from the main drive shaft to all of the conveyor rollers in the series.

The shaft at each end of a roller is mounted in a bearing assembly bolted to one of the two side rails. Upon unbolting the bearing assemblies from the side rail at each end of a roller, the end shafts with rollers attached are readily removable through a slot in the top of each side rail. This enables convenient replacement of each roller and drive gear, independent of all of the others. The idler gears are mounted on shafts which are also mounted in bearings bolted to the side rails and readily removable individually without removal of any other rollers or gears.

The conveyor is provided in discrete lengths so that it is usable in modular form. A lubricating oil bath is provided for the idler gears in each length and can be filled and drained separately from the oil bath in an adjacent length of conveyor. A hinged lid and bolted bulkhead ends are provided for lubricating oil confinement and exclusion of dirt.

DESCRIPTION OF THE PREFERRED EMBODIMENTS

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, the illustrated conveyor structure includes a framework including a left-hand side rail 1 and a right-hand side rail 2 connected to each other by three U-channel cross braces 5. The side rail 1 is formed in a U-channel shape for several purposes which will be described hereinafter. The side rail 2 is L-shaped, for convenience.

Figure 1:
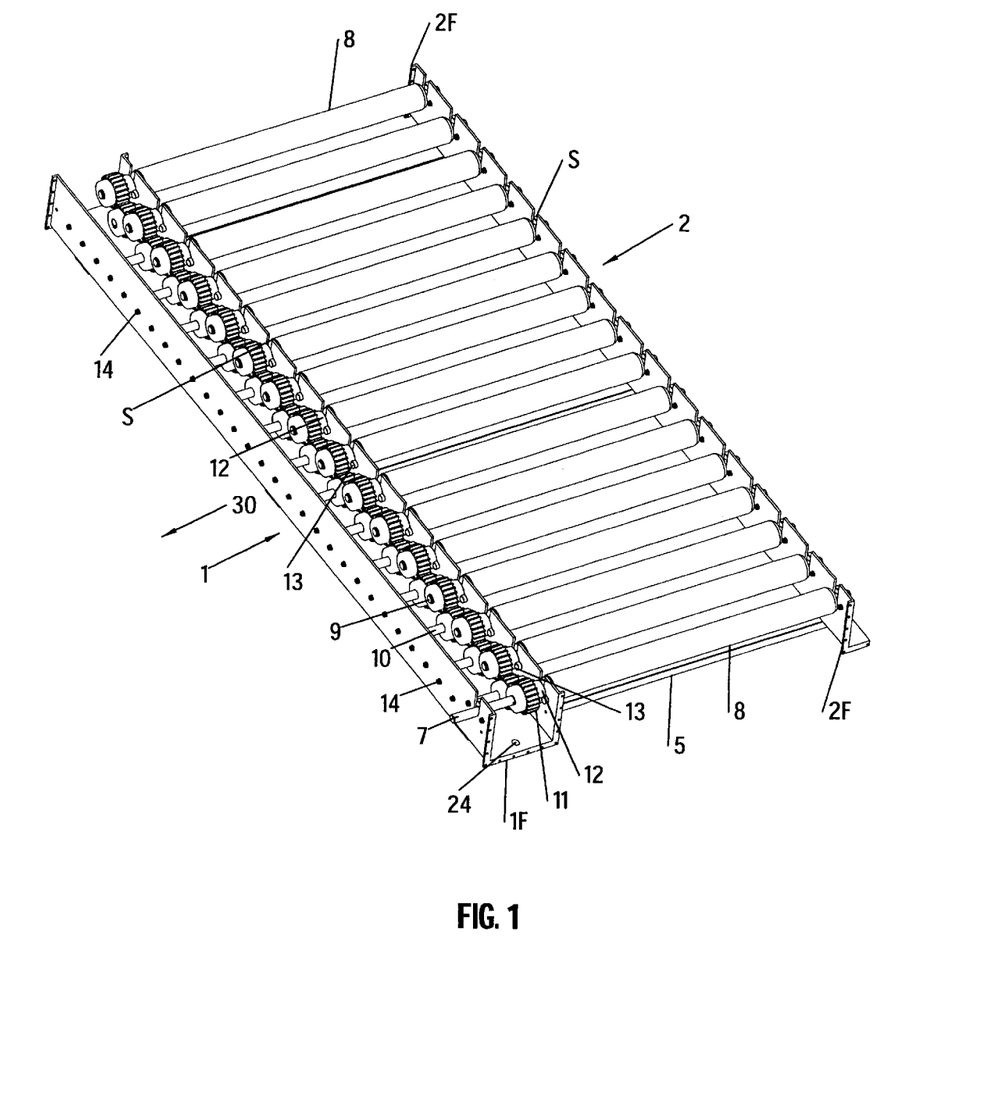
FIG. 1 is a perspective view of one length of conveyor assembly.
Figure 2:
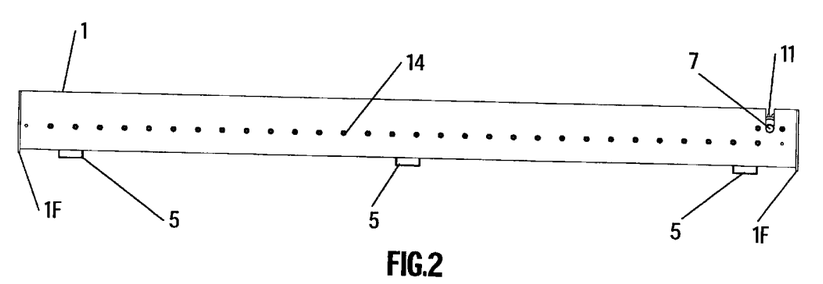
FIG. 2 is a side elevational view thereof.
Figure 15:
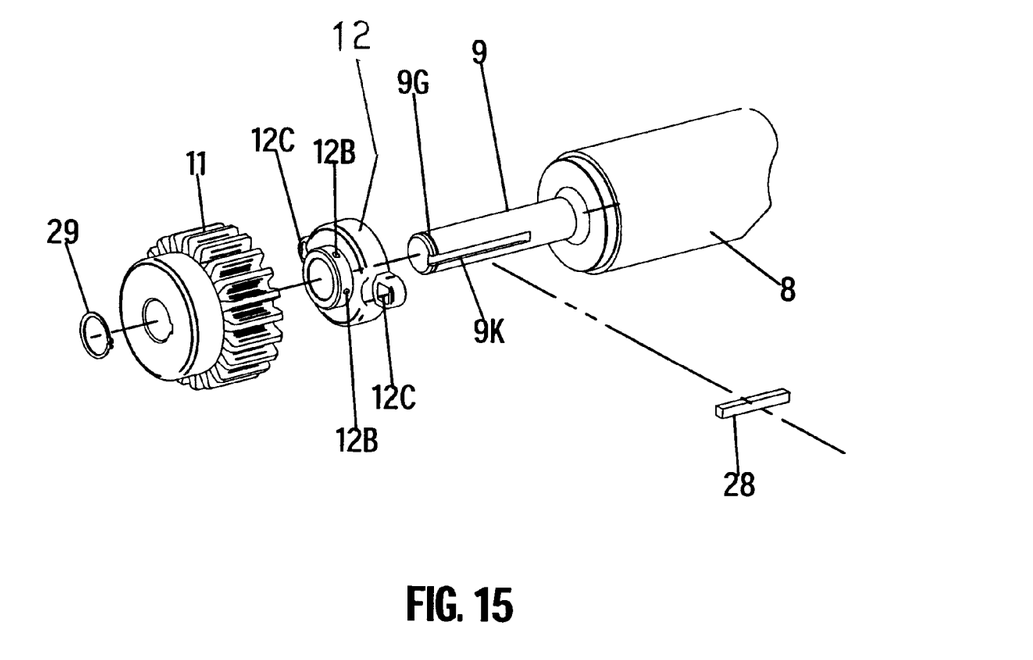
FIG. 15 is a perspective view of one end of the roller shown in FIG. 13 illustrating the mounting of the roller bearing and spur gear onto the shaft of the roller to the shaft.

A series of cargo supporting rollers 8 is provided along the length of the conveyor. Since a feature of the invention is to provide the conveyor in modular form, each module may be constructed of a convenient length, eight feet being an example. Typically, the rollers are tubular steel with an end cap at each end to which one end of a shaft 9 is welded. However, it should be understood that the length of shaft 9 need not be the same at each end of roller 8. As shown in FIG. 15, a typical shaft 9 is received through the shaft clamping collar 12A of the inner race of a bearing assembly 12 and secured thereto by a couple of set screws 12B. The same type of connection is provided at both ends of each roller. Referring to FIG. 1, there is a slot S provided in the upper edge of the inboard upstanding flange of each side rail 1 and 2 and is of a width adequate to receive a roller shaft down through it. Therefore, each roller 8, together with its related shaft 9 and bearing assembly mounted on the shaft at both ends, can be received directly down into the lateral space between the side rails. Then, upon inserting carriage bolts 13 through the rectangular apertures 12C in the bearing assembly bosses, and through apertures in the inboard flanges of the side rails, hexagonal lock nuts 14, for example, can be installed on the carriage bolts to fasten the bearing assemblies to the respective side rails. Removal of roller 8 is easily accomplished by reversing the above-described steps. Importantly, each roller 8 and associated bearing assemblies may be removed without removing the adjacent roller assembly.

A spur gear 11 is mounted to the left-hand end shaft of each of the rollers, secured against rotation by a key 28 in a keyway 9K, and retained axially by snap rings 29 in appropriate snap ring grooves 9G in the shaft. The above-described gears are the upper set of spur gears and may be referred to herein as the roller drive gears.

A second set of spur gears 11 is provided slightly below the upper set. Each of these gears meshes with two adjacent gears of the upper set of roller drive gears. Each is mounted to an idler gear shaft 10 and retained axially thereon by snap rings and keyed to the shaft to prevent relative rotation therebetween. Each of the idler shafts is also mounted to a bearing assembly, such as 12, both at the inboard upstanding flange of the side rail 1 and at the outboard upstanding flange of the side rail 1. However, it should be understood that one of the bearing assemblies can alternatively be mounted on the outside face of the outboard upstanding flange, instead of on the inside face. The mounting of the idler shafts to the bearing assemblies, and the bearing assemblies to side rail 1 is done in the same way as described above for the mounting of roller drive gears and roller bearing assemblies to the inboard flange of side rail 1 and the upstanding flange of side rail 2.

Figure 3:
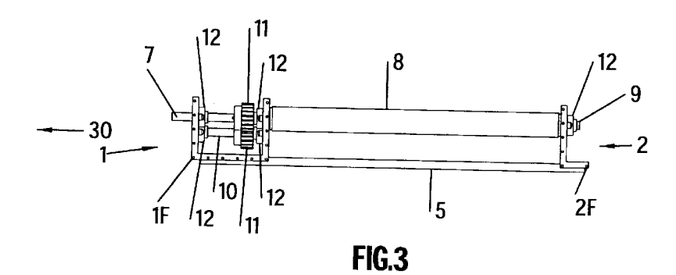
FIG. 3 is a front end view thereof.
Figure 4:
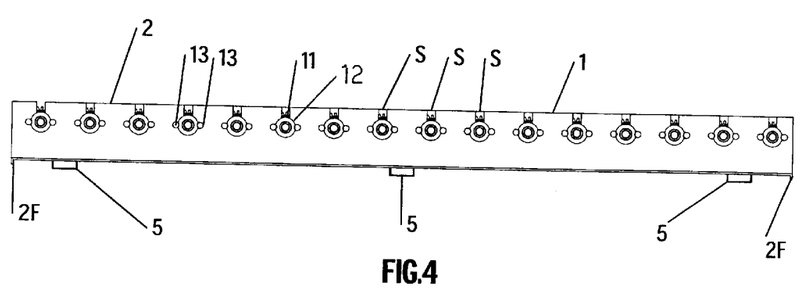
FIG. 4 is a right side view thereof
Figure 5:
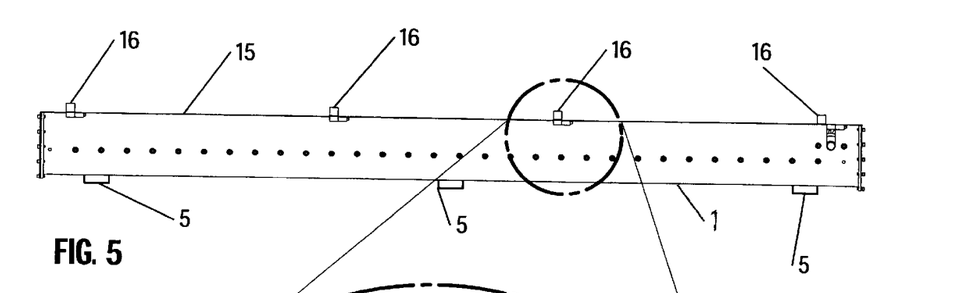
FIG. 5 is a left side view thereof with a hinged cover mounted thereto.

As can be seen best in FIG. 3, there is considerable space between the idler shaft outboard bearing assemblies and inboard bearing assemblies in the channel of side rail 1. In fact, this space is wide enough to enable sliding an idler gear outward in the direction of arrow 30 (FIG. 3) so that it is spaced away from the outside edge of any drive gear of the upper set. Therefore, to remove one of the idler gears, it is simply necessary to remove the snap ring from its respective shaft 10, slide the idler gear outward on the shaft, remove the carriage bolts from the inboard and outboard bearing assemblies supporting the shaft, and slide the whole combination of inboard and outboard bearing assemblies, shaft and idler gear straight up out of the side rail channel. While doing so, the shaft 10 passes up through the space between the two roller drive gears in the upper set to which the removed idler gear had been engaged until it was slid outward on shaft 32 to clear the drive gears for removal of the idler gear, shaft and bearing assembly.

Figure 14:
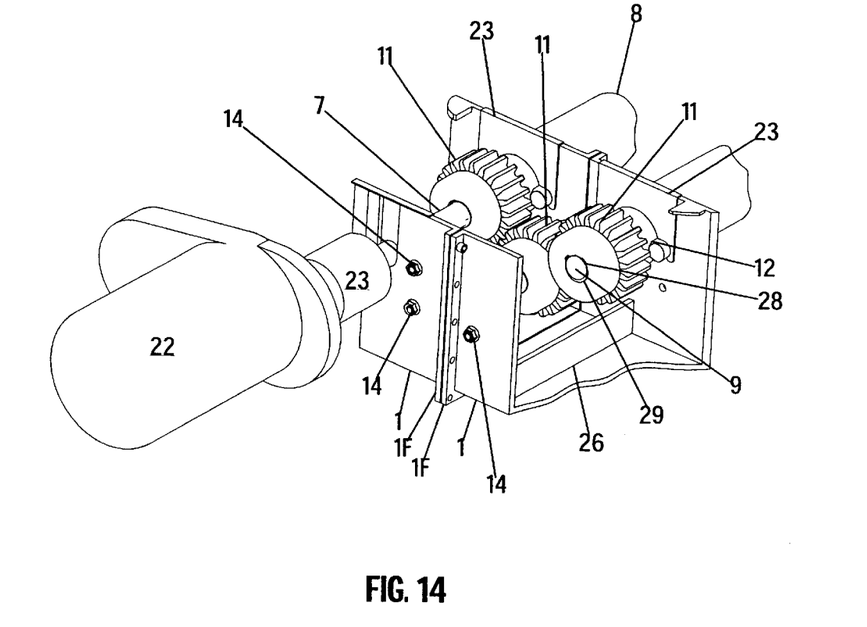
FIG. 14 is a perspective view of the conveyor illustrating a fragmentary section of a connection between two sections of conveyor, and also showing various details of the drive assembly and the spur gears.

Referring to FIG. 14, a drive for the conveyor assembly is provided by a gear motor 22, whose output shaft is coupled through a Lovejoy brand universal coupler 23 to the main roller drive shaft 7 at the front end of the conveyor. Therefore, the gear on this shaft, which is mounted in the same way as the other gears, provides the drive from the motor, through the idler gears and other rollers gears in the series, throughout the entire length of this conveyor module. It should be understood that the drive for the conveyor assembly can be positioned anywhere along the length of the conveyor module, including the middle of the module.

Figure 9:
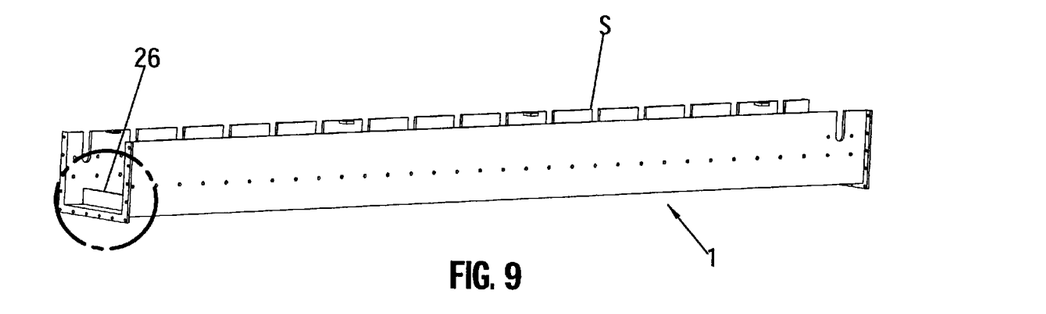
FIG. 9 is a perspective view of the drive side rail channel showing an oil dam disposed near the rear end of the rail channel.
Figure 10:
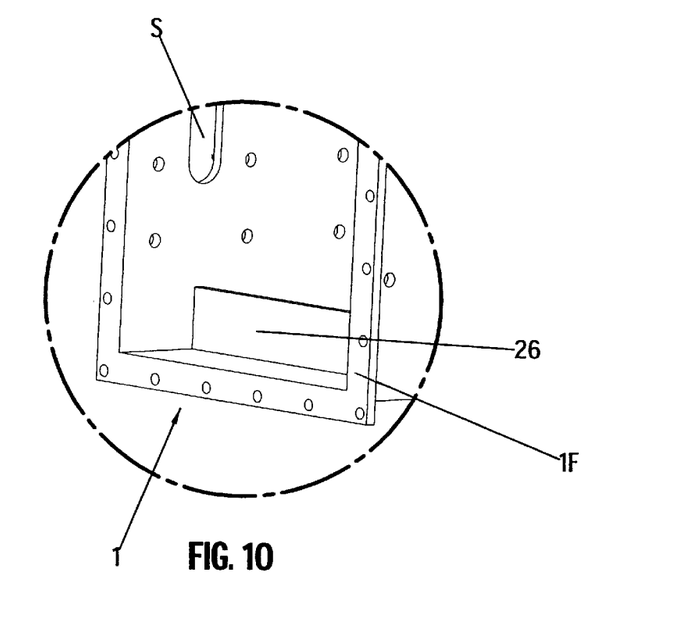
FIG. 10 is an enlarged detail of the rear end of the drive side rail channel showing the oil dam disposed therein.
Figure 11:
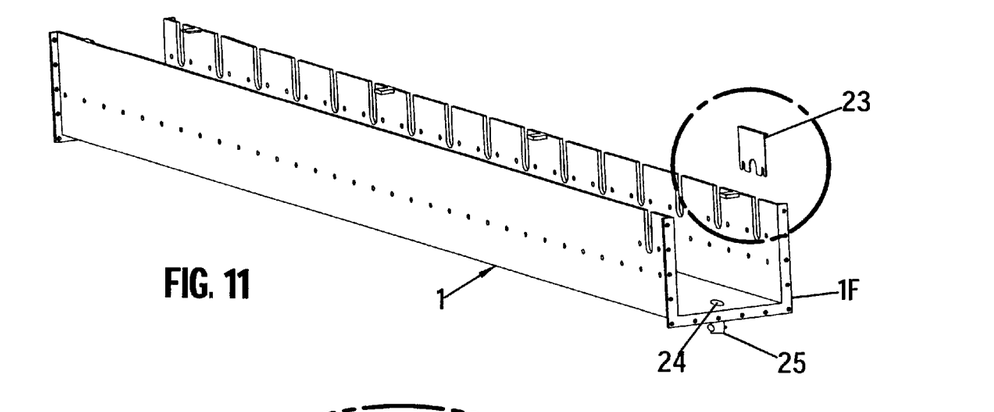
FIG. 11 is a perspective view of the drive side rail channel showing placement of a dust cover adjacent the vertical slots in the rail channel.
Figure 12:
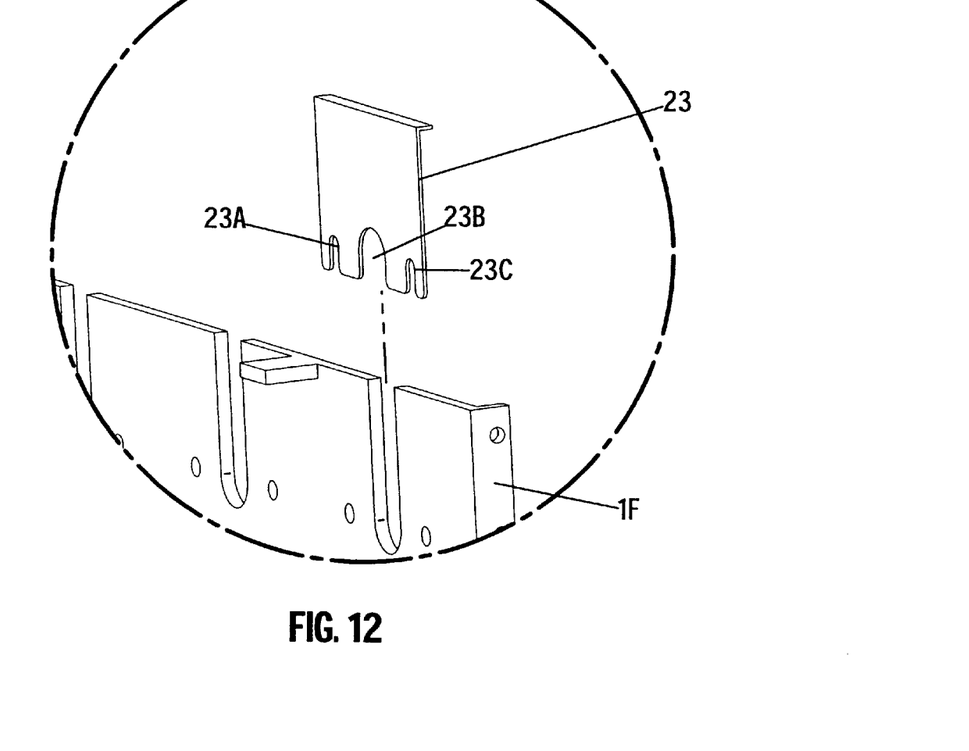
FIG. 12 is an enlarged detail of the dust cover and its positioning adjacent the vertical slots in the rail channel.
Figure 13:
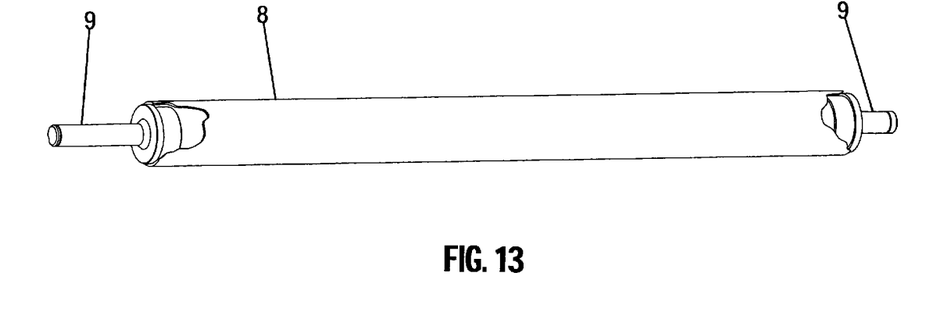
FIG. 13 is a perspective view of a roller used with the conveyor.

Outwardly turned bolting flanges are provided at each end of each of the side rails. They are useful to connect conveyor modules end-to-end in a string (FIG. 14). Also, as indicated previously, there is provision for lubricating oil for the gears. The out-turned flanges on the sides and bottom of the left-hand side rail 1 enable mounting cover plates 20 to close the ends of the U-channel. Each of these flanges has a plurality of bolt holes in it to receive bolts 21 to bolt the end plate 20 to the end of the side rail. A gasket 19 is provided to contain lubricating oil in the channel. There is a drain hole 24 in the bottom of the channel which is connected through a drain tube and drain valve 25 (FIG. 11) so that lubricant can be drained out of the channel when desired. There is a dam or weir 26 (FIGS. 9–10) at the opposite end of the channel so that, even if the next module of conveyor is removed, the oil in the channel of this first module will not run out the far end. Since each module is constructed essentially identical to each of the other modules, a removed module can be drained of oil through a drain hole and valve such as 24 and 25 in the illustrated module, before disconnecting from an adjacent module. It should be understood that a weir 26 can also be placed at both ends of the channel, or only at the end including drain valve 25.

Figure 8:
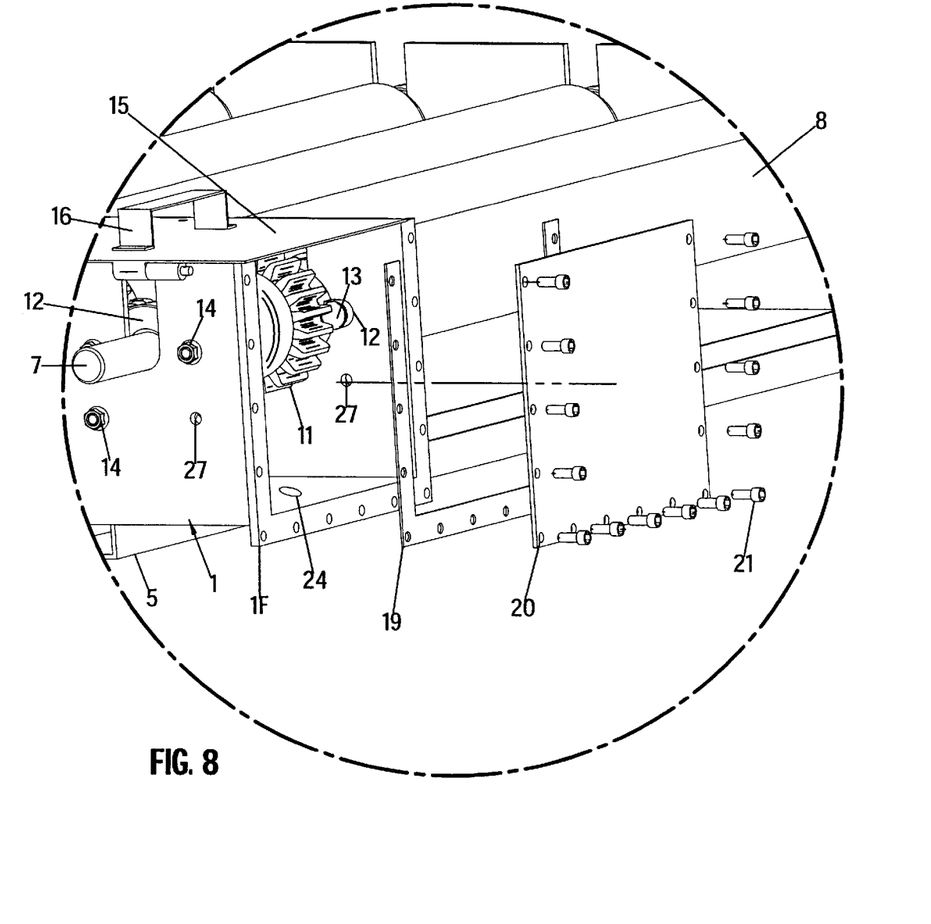
FIG. 8 is an enlarged detail of the front end of the drive side rail channel showing the main drive gear, and with the channel end sealing gasket and end plate ready for installation.

Referring collectively to FIGS. 8 and 14, to provide continuity of drive from one module to the next, there is a provision for mounting a bearing assembly across the joint between two modules. For this purpose, a bearing fastener bolt hole 27 is provided in the inboard upstanding flange and outboard upstanding flange of the channel of side rail 1 at such distance from the end flanges of the channel as to locate the shaft of an idler gear at the joint so the idler gear is spanning the joint and is properly meshed with the roller drive gears on the end rollers of the one module and the next module which are nearest each other. Therefore, for connection of one module to the next, instead of using the bolt such as 21 to fasten an end plate on a module, the bolts are used to fasten the flanges of one to the flanges of the next. The inwardly turned flange 2F of the side rail 2 is used to bolt that end to the end of a next module in the series of modules of a conveyor system according to the present invention.

Figure 6:
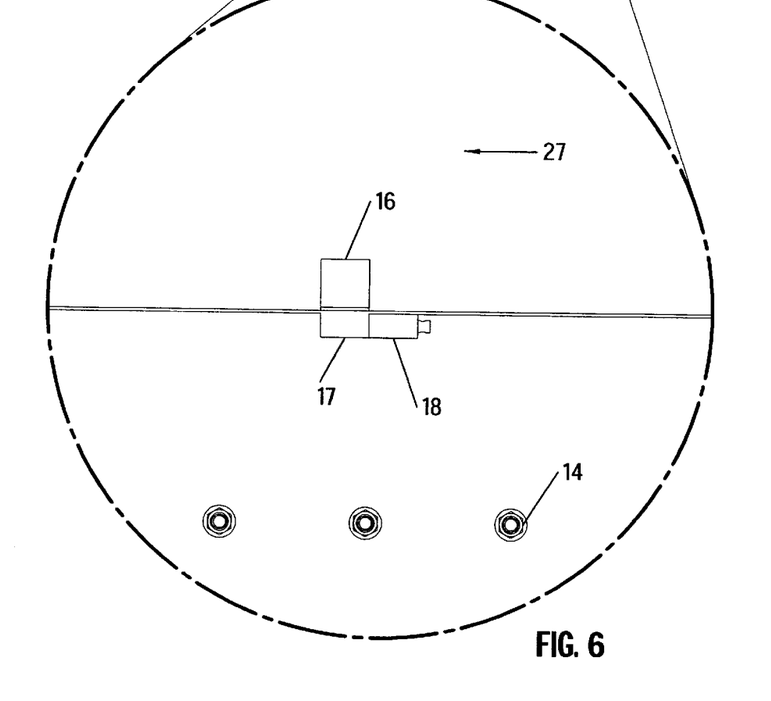
FIG. 6 is an enlarged detail of a cover hinge mounting.
Figure 7:
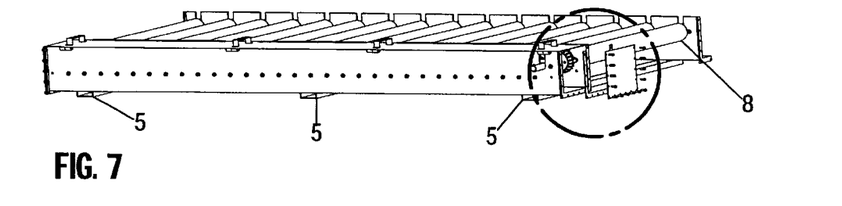
FIG. 7 is a perspective view of the conveyor with the rear end of the drive side rail channel closed by an end plate, and with the front end open showing an end plate removed.

To exclude dirt from the gear sets, and confine any oil spray generated by the spinning idler gears in the oil bath, a drive side rail cover 15 is provided. It is shown in a closed position in FIGS. 5–8. Cover 15 has a hinge pin 17 welded on the cover and extending through a hinge tube 18 welded on the side rail. Handles 16 facilitate raising the cover for access to the interior of the side rail which, together with the cover, provides a gear housing. If it is desired to remove the cover, it can simply be moved in the direction of arrow 27 in FIG. 6, which pulls the hinge pins from the hinge tubes, whereupon the cover can be lifted away completely. If further control of oil mist and exclusion of dirt from access to the gear housing is desired, a plate 23 can be slid down between each roller shaft bearing assembly and the U-channel-facing face of the slotted upstanding flange of side rail 1 adjacent each of the slots, to cover the slot. This plate can be provided with three upwardly extending slots 23*a*, 23*b*, 23*c* extending from the lower edge of plate 23 so it can be slid down over the carriage bolts and the roller shaft when the carriage bolts are loose, between the bearing assembly and the side rail flange, and secured in place when the nuts are fastened tightly on the carriage bolts.

From the foregoing description, it should be evident that the present invention provides a carriage assembly module of comparatively simple and reliable construction. It can be serviced with extreme ease, as each roller can be removed and replaced independent of all others. Additionally, each gear can be removed and replaced independent of all others. Moreover, each bearing assembly can be removed and replaced independent of all others. Simple and reliable lubrication of the gears is also provided. Addition or removal of conveyor modules to provide a system of any desired length is contemplated. If there is a desire to operate different lengths at different lineal speeds, it is only necessary to omit the idler between two adjacent lengths, provide a roller with a long shaft, and another drive motor for the next length of conveyor. Another possibility would be to use a main drive roller and shaft arrangement somewhere along the length of the conveyor or at the far end and connected to a speed changer connected to a similar roller in the next module of the conveyor.

Therefore, while the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A roller conveyor, comprising:
   - a support frame extending in a longitudinal direction and including a pair of laterally opposing side rails defining a transverse region therebetween, at least one of said side rails defines a plurality of slots extending from a longitudinal edge thereof;
   - a plurality of roller members extending across said transverse region and longitudinally spaced along said support frame, each of said roller members has a first end portion and an opposing second end portion, each of said first and second end portions is rotatably connected to said support frame, said first end portion extends through a corresponding slot in said at least one of said side rails;
   - a first set of gears, each gear of said first set of gears is fixedly attached to a corresponding roller member at said first end portion;
   - a second set of gears, each gear of said second set of gears positioned so as to intermesh between corresponding adjacent gears of said first set of gears and rotatably connected to said support frame; and
   - a gear drive operably connected to a gear of said first and second sets of gears.

2. The conveyor of claim 1, wherein said first and second sets of gears are positioned outside of said transverse region.

3. The conveyor of claim 2, wherein said first end portion is a shaft defining an annular groove, a corresponding one of said first set of gears is slidably received on said shaft and is positioned between said annular groove and said at least one of said side rails, said corresponding one of said first set of gears is axially retained on said shaft by a snap ring positioned in said annular groove.

4. The conveyor of claim 3, wherein said shaft and said corresponding one of said first set of gears cooperate to define a keyway, said corresponding one of said first set of gears is rotationally secured to said shaft by positioning a key in said keyway.

5. The conveyor of claim 1, wherein said longitudinal edge of said at least one of said side rails is an upper edge, and said second set of gears is positioned below said first set of gears.

6. The conveyor of claim 5, further comprising a generally U-shaped channel for containing a lubricant, said channel has opposing side walls connected by a bottom wall, said at least one of said side rails forming one of said side walls.

7. The conveyor of claim 6, wherein each of said second gears is slidably received on a corresponding shaft, said shaft is positioned between said opposing side walls and is rotatably connected to at least one of said side walls, said shaft defining an annular groove, a corresponding one of said second set of gears is positioned between said annular groove and said at least one of said side rails and is axially retained on said shaft by a snap ring positioned in said annular groove.

8. The conveyor of claim 7, wherein said shaft and said corresponding one of said second set of gears cooperate to define a keyway, said corresponding one of said second set of gears is rotationally secured to said shaft by positioning a key in said keyway.

9. The conveyor of claim 6, wherein said channel includes a weir plate extending between said opposing side walls and upwardly from said bottom surface, said weir plate positioned adjacent one end of said channel, said bottom surface defines a drain hole, said drain hole is in fluid communication with a drain valve.

10. The conveyor of claim 6, wherein said channel includes at least one end wall closing an end of said channel.

11. The conveyor of claim 6, further comprising an access cover hingedly connected to one of said side walls, said access cover closing the top of said channel.

12. The conveyor of claim 6, further comprising a plurality of cover plates, each of said cover plates is configured to cover a corresponding one of said slots in said at least one of said side rails.

13. The conveyor of claim 1, wherein said gear drive has an output shaft directly coupled to said first end portion of one of said roller members.

14. The conveyor of claim 1, wherein a plurality of said roller conveyors are configured to be longitudinally connected end-to-end.

15. The conveyor of claim 14, wherein at least one end of said opposing side rails includes a flanged portion, said flanged portions of one of said roller conveyors is operably attached to said flanged portions of another of said roller conveyors.

16. The conveyor of claim 15, wherein said first set of gears of said one of said roller conveyors and said first set of gears of said another of said roller conveyors are driven by a common gear drive.

17. A roller conveyor, comprising:
- a support frame extending in a longitudinal direction and including a pair of laterally opposing side rails defining a transverse region therebetween;
- a plurality of roller members extending across said transverse region and longitudinally spaced along said support frame, each of said roller members is rotatably connected to said support frame;
- a first set of gears, each gear of said first set of gears is fixedly attached to a corresponding roller member and is positioned adjacent one of said side rails;
- a generally U-shaped channel for containing a lubricant, said channel having opposing side walls connected by a bottom wall, said one of said side rails forming one of said side walls;
- a second set of gears positioned below said first set of gears, each gear of said second set of gears is slidably received and rotationally secured to a corresponding shaft, said shaft is positioned between said opposing side walls and is rotatably connected to at least one of said side walls so as to allow each gear of said second set of gears to intermesh between corresponding adjacent gears of said first set of gears, said shaft defines an annular groove, a corresponding gear of said second set of gears is positioned between said annular groove and said one of said side rails and is axially retained on said shaft by a snap ring positioned in said annular groove; and
- a gear drive operably connected to a gear of said first and second sets of gears.

18. The conveyor of claim 17, wherein said first and second sets of gears are positioned outside of said transverse region.

19. The conveyor of claim 17, wherein said shaft is received through a pair of bearings, each of said bearings is respectively attached to a side wall of said channel, said bearings and said corresponding gear defining a width when positioned in an abutting relationship, said width being less than a distance between said first set of gears and a side wall of said channel opposite said one of said side rails.

20. The conveyor of claim 17, wherein said shaft and said corresponding gear cooperate to define a keyway, said corresponding gear is rotationally secured to said shaft by positioning a key in said keyway.

21. A roller conveyor, comprising:
- a support frame extending in a longitudinal direction and including a pair of laterally opposing side rails defining a transverse region therebetween, each of said side rails defines a plurality of slots extending from an upper edge thereof, said slots in one of said side rails are positioned generally opposite said slots in the other of said side rails to define generally opposing pairs of slots;
- a plurality of roller members, each extending across said transverse region and positioned within a corresponding one of said opposing pairs of slots, each of said roller members is rotatably connected to each of said side rails;
- a set of drive gears, each of said drive gears fixedly attached to an end portion of a corresponding roller member and positioned adjacent one of said side rails outside of said transverse region;
- a generally U-shaped channel for containing a lubricant, said channel having opposing side walls connected by a bottom wall, said one of said side rails forming one of said side walls;
- a set of idler gears positioned below said set of drive gears, each of said idler gears is slidably received and rotationally secured on a corresponding idler shaft, said shaft is positioned between said opposing side walls and is rotatably connected to at least one of said side walls, said shaft defines an annular groove, a corresponding one of said idler gears is positioned between said annular groove and said one of said side rails and is axially retained on said shaft by a snap ring positioned in said annular groove; and
- a gear drive operably connected to one of said drive and idler gears.

* * * * *